Oct. 19, 1943.  E. C. SOULE  2,332,179
METHOD OF PRODUCING PHENAZINE OXIDE
Filed Oct. 1, 1940  2 Sheets-Sheet 1
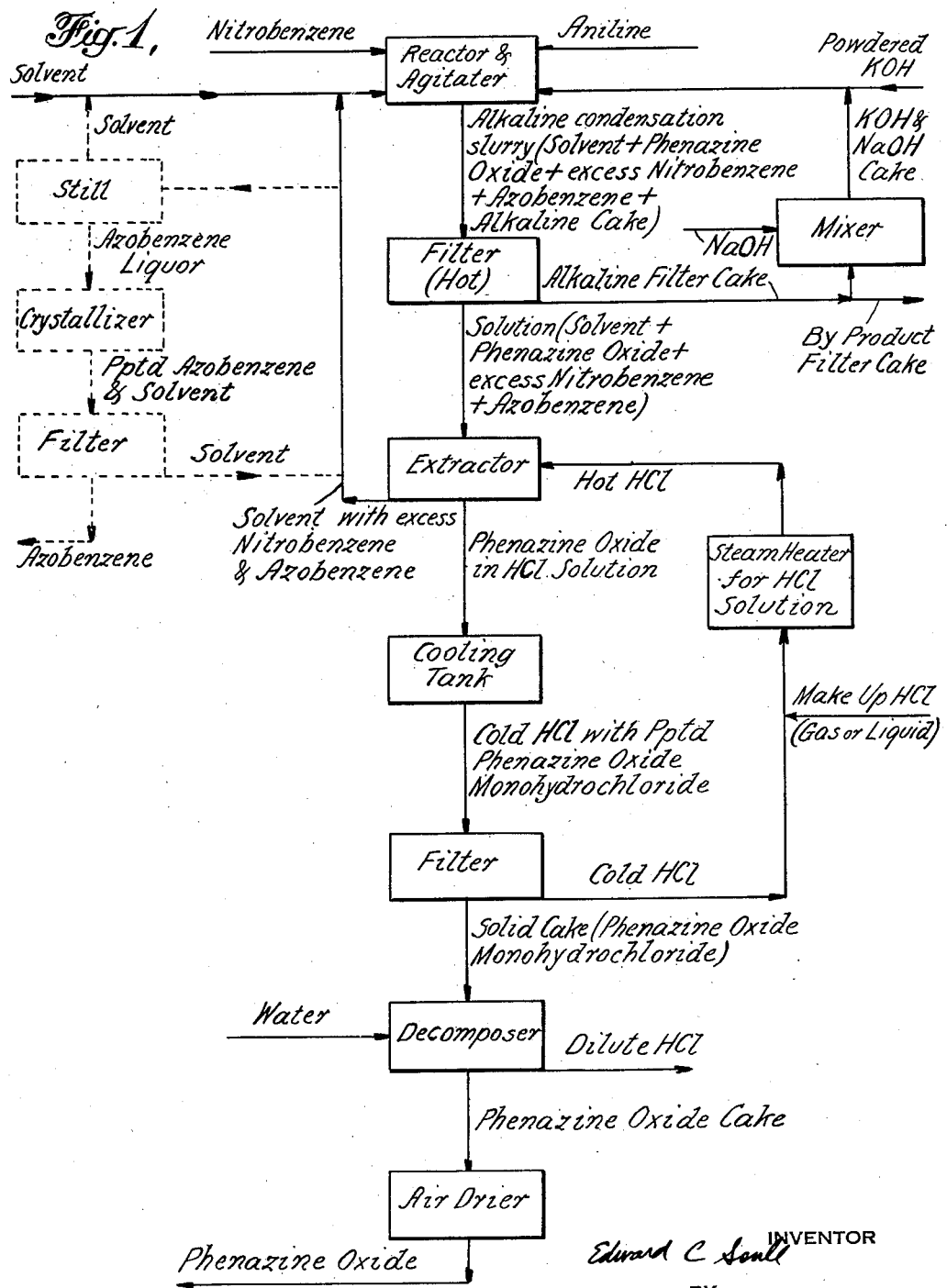

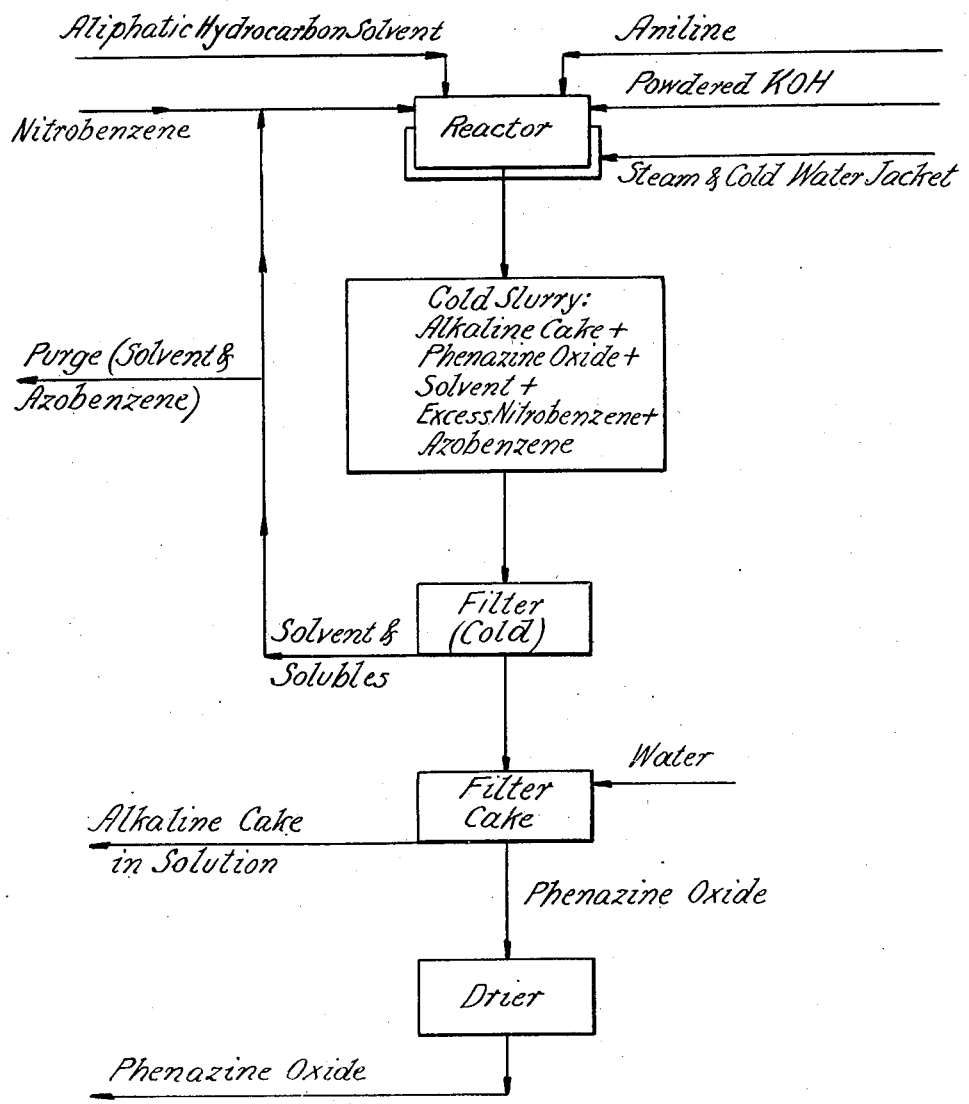

Patented Oct. 19, 1943

2,332,179

UNITED STATES PATENT OFFICE 2,332,179

METHOD OF PRODUCING PHENAZINE OXIDE

Edward Cornelius Soule, Niagara Falls, N. Y., assignor to The Mathieson Alkali Works, Inc., New York, N. Y., a corporation of Virginia Application October 1, 1940, Serial No. 359,294

15 Claims. (Cl. 260—267)

This invention relates to improvements in the production of phenazine oxide (di-benzo-para-di-azine oxide), and phenazine therefrom, from nitrobenzene and aniline by an alkaline condensation reaction.

The present invention provides an improved process for the production of phenazine oxide from aniline and nitrobenzene in which the alkaline condensation reaction is carried out in the presence of an inert diluting solvent with resulting advantages in temperature control, increased yields of phenazine oxide based on the aniline used and reduction or elimination of the formation of undesirable by-products. The invention provides an improved process in which an excess of nitrobenzene is advantageously employed with resulting increase in yield of phenazine oxide and reduction in amount of azobenzene formed. The invention also provides an improved process which is advantageously carried out in a cyclic manner with reuse of the solvent and of the excess nitrobenzene and also with reuse of the alkaline cake produced as a by-product of the reaction in the further carrying out of the reaction. The invention also includes improvements in the separation and purification of the phenazine oxide. The invention includes various features and improvements which, or certain of which, are capable of conjoint use in carrying out the process and are advantageously used in doing so. The nature and advantages of the invention and of its various improvements will be more fully described in the following more detailed description.

It has heretofore been proposed to carry out the condensation of nitrobenzene and aniline, used in equal proportions by weight, in the presence of caustic potash, but the chief product obtained is azobenzene, with a relatively low yield of phenazine oxide, and with the production of undesirable by-products. In attempting to carry out this process by condensing aniline, a reducing agent, with nitrobenzene, an oxidizing agent, in the presence of finely ground caustic potash, I have found that this operation is a dangerous one and difficult to control. As the temperature is carefully raised to cause the condensation to begin, reaction occurs autocatalytically with such suddenness and vigorous evolution of heat as to cause a temperature rise in an uncontrollable manner to a relatively high temperature, e. g., around 300° C. This results in vigorous and more or less complete vaporization of the remaining unreacted nitrobenzene and aniline as well as the production of objectionable by-products. In attempting to carry out this process on a large scale there is danger of explosion if the vapors are confined.

I have found, however, that the condensation of aniline with nitrobenzene in the presence of finely ground potassium hydroxide can be carried out smoothly and without objectionable autocatalytic action if the condensation is conducted in the presence of an inert diluting solvent such as benzene, toluene, hexane, ligroin, etc. which will be appreciably miscible with both nitrobenzene and aniline. In the presence of a diluting inert solvent the temperature of condensation may be advantageously held between such temperature limits as 60° C. to 130° C. for a sufficient length of time to insure substantially complete usage of all of the aniline charged, and particularly so where a sufficient amount of nitrobenzene is used. Between these temperature limits the condensation will proceed to substantial completion with a minimum of by-products and a maximum of safety of operation. The inert diluting solvents are advantageously so chosen, or mixtures thereof so chosen, as to regulate the temperature of the reaction by the refluxing of the solvent.

I have also found that substantial improvements in yield and purity of phenazine oxide, and of phenazine therefrom, and reduction of undesirable by-products, can be effected by maintaining the nitrobenzene in molecular excess over the aniline charged for condensation. By employing a sufficient excess of nitrobenzene over aniline in the condensation charge, the mechanisms of the condensation may be so changed as to favor the formation of phenazine oxide, while substantially eliminating undesirable by-products such as tar, carbon and ammonia. In addition, the yields of undesirable azobenzene can be materially decreased as the mole excess of nitrobenzene over aniline is increased until at large excesses the azobenzene is almost completely eliminated, and a high yield of phenazine oxide, based on the aniline, is obtained.

The process is particularly advantageous when both an inert solvent and an excess of nitrobenzene are employed. Since it is primarily the reaction of finely ground solid caustic potash on nitrobenzene which is responsible for the autocatalytic uncontrollable nature of the reaction, the hazard would increase as the nitrobenzene is raised to a large excess over the aniline, if the inert solvent were not employed. But when an inert diluting solvent is employed, a large excess of nitrobenzene can be used without such danger and with the combined advantages of the inert solvent and of the excess of nitrobenzene, including high yields of phenazine oxide, and minimizing or prevention of the formation of azobenzene and of other objectionable by-products such as carbon, tar and ammonia. As a result it is possible to produce a raw phenazine oxide product which is free or relatively free from objectionable impurities and which, when suitably separated from the reaction mixture is of sufficient purity to be used directly and without further purification; and the phenazine produced therefrom can be similarly used.

The proportions of nitrobenzene and aniline used in the process can be varied; and certain of the advantages of the process can be obtained with the use of an inert solvent and even though a large excess of nitrobenzene over aniline is not employed. In general, however, at least one mole of nitrobenzene will be employed for each mole of aniline; and an excess of nitrobenzene is advantageously employed. Even with equal molar proportions of nitrobenzene and aniline considerably better yields of phenazine oxide and smaller yields of undesirable azobenzene may be obtained, when an inert solvent is employed. As the molar excess of nitrobenzene increases the yield of phenazine oxide is found to markedly increase and the yield of azobenzene to markedly decrease. For example, with equal molar quantities of nitrobenzene and aniline, and with the use of an inert solvent, I have obtained yields of around 30% of phenazene oxide based on the aniline employed; while by increasing the nitrobenzene to about 2 moles for each mole of aniline the yield of phenazine oxide has been around 50% based on the aniline; and with a molar proportion of around 4 to 8 moles of nitrobenzene to one of aniline I have obtained around 65 to 70% or more of the phenazine oxide, based on the aniline. The quantity of finely ground potassium hydroxide required for the condensation can be materially reduced when an inert solvent is employed, as compared with the amount required when such solvent is not used. By operating with equal or excess mole quantities of nitrobenzene over aniline and employing an inert diluting solvent medium, I have been able to reduce materially the amount of alkali required for condensation and at the same time obtain higher yields of phenazine oxide. Instead of using an amount of alkali (e. g. 87% finely ground potassium hydroxide) which is largely in excess of the combined amount of nitrobenzene and aniline used, I have found that only around .66 to 1.0 part by weight of this alkali need be used for one part of combined reactants (nitrobenzene and aniline) to give high yields of the desired product, phenazine oxide, with minimum by-product formation and consumption of excess nitrobenzene present.

At the conclusion of the condensation, the reaction mass is a slurry consisting of solvent and dissolved constituents and insoluble constituents which on filtering form a cake. The insoluble constituents include excess alkali and alkaline compounds such as the potassium salts of nitrophenol. The excess nitrobenzene, and any unreacted aniline, are readily soluble in or miscible with the inert solvent employed. The azobenzene formed is also readily soluble in the solvent. Depending upon the solvent used, the phenazine oxide may be largely or completely in solution or it may be largely precipitated, and separable with the press cake on filtering. The solubility of phenazine oxide in aromatic solvents such as benzene, particularly when hot, is such that it will largely or entirely remain in solution, when sufficinet solvent is employed. Phenazine oxide is less soluble in cold benzene and, if the reaction mixture is cooled, some of the phenazine oxide may be precipitated. In the case of straight chain hydrocarbons, such as hexane and ligroin, which have only a limited solubility for phenazine oxide, this product will be largely present as a solid in the reaction mixture. When a considerable excess of nitrobenzene is used this has a solvent action on the phenazine oxide and, even with straight chain hydrocarbon solvents, the presence of the excess nitrobenzene will hold part of the phenazine oxide in solution, particularly at higher temperatures.

The present invention provides various methods of working up the reaction mass and of separating the phenazine oxide therefrom. In general, the reaction mixture or slurry, consisting of solvent, dissolved constituents and insoluble cake, is filtered to separate the dissolved and insoluble constituents. When an aromatic solvent such as benzene is employed, and the slurry is filtered hot, the phenazine oxide will be largely contained in the hot solution and can be advantageously separated therefrom by extraction with an acid solution, such as 15% to 20% aqueous hydrochloric acid solution, to remove the dissolved phenazine oxide and leave behind azobenzene and excess nitrobenzene in the solvent. The solvent and dissolved constituents can then be advantageously returned to the process for reuse until such time as the amount of azobenzene increases to the point where it is desirable to subject the solvent to distillation to separate the azobenzene. When a solvent such as hexane or ligroin is employed, in which phenazine oxide has only a limited solubility, the solvent and dissolved constituents separated from the slurry or reaction mixture by filtration can be directly returned to the process for further use, without extracting the phenazine oxide from it; although if a sufficient excess of nitrobenzene is present, so that a materially increased amount of phenazine oxide is in solution, the solvent can be extracted with dilute acid to remove the phenazine oxide before reuse in the process.

The aqueous acid solution of the phenazine oxide, resulting from extraction of the phenazine oxide from the solvent, may be neutralized directly with ammonia or other base to precipitate the phenazine oxide therefrom. This is filtered by any suitable means and dried to constant weight. The aqueous acid solution, before neutralization and precipitation, may be boiled with a little aqueous nitric acid to oxidize traces of impurities, and then neutralized.

The treatment of the press cake, separated from the slurry or reaction mixture by filtration, may also vary somewhat depending upon the solvent employed. With aromatic solvents such as benzene, and where the slurry is filtered hot, most of the phenazine oxide will be removed with the solvent, and the press cake may in that case be further washed with solvent to remove phenazine oxide contained therein and the solvent added to that to be subjected to acid extraction. The press cake or filter cake in this case may be advantageously admixed with finely divided sodium hydroxide, and the resulting mixture returned to the process as the alkaline condensing reagent. When the potassium-containing cake is mixed with sodium hydroxide, the potassium present in the cake as potassium salts of phenols as well as excess potassium hydroxide present, is rendered available for condensation in the further carrying out of the process. The cake resulting from the use of this condensing agent will be a sodium-containing cake and in general will be discarded as not suitable for further reuse, or will be worked up to recover the phenols therefrom.

The press cake separated when straight chain hydrocarbons such as hexane or ligroin are employed, and particularly when the slurry or reaction mixture is filtered cold, will contain most of the phenazine oxide admixed with the other constituents of the alkaline cake. This cake is advantageously treated with water to decompose and separate the alkaline potassium nitrophenol salts which are removed from the crude phenazine oxide which is substantially water insoluble.

Certain of these operations make the process cyclic in character. Thus the separation of the solvent and dissolved constituents from the slurry or reaction mixture, and the extraction of the solvent to remove phenazine oxide, when present in substantial amount, enable the solvent to be returned to the process together with excess nitrobenzene and azobenzene. The nitrobenzene is thus made available to supply a part of that required in the further carrying out of the process and the azobenzene is unobjectionable, and may even be advantageous, so long as the amount does not increase too highly. When, after repeated use of the solvent, the azobenzene content increases to a point where it is objectionable, the solvent can be subjected to distillation to separate it from the azobenzene which may then be separated and obtained as a product of the process.

Similarly the utilization of the alkaline filter cake by admixture with sodium hydroxide, makes the process cyclic in character, although, in this case, only a single recycle is advantageous.

The process is also advantageously cyclic in character, when the solution, separated from the reaction mixture at the end of the reaction, is extracted with hydrochloric acid to separate the phenazine oxide. By carrying out the extraction with hot hydrochloric acid and hot solvent the phenazine oxide remains in solution in the hot dilute hydrochloric acid; but on cooling the phenazine oxide is precipitated as the monohydrochloride and can be filtered off, leaving the excess hydrochloric acid for return to the process after reheating and after addition of gaseous or liquid hydrochloric acid to make up for that lost as monohydrochloride. In this case the phenazine oxide monohydrochloride can also be advantageously decomposed by washing with water, which leaves the phenazine oxide ready for separation by filtration and drying.

The invention will be further illustrated by the following examples in which the nature and advantages of the process will be illustrated, and various alternative steps and procedures described.

*Example 1.*—24.6 kilos of commercial nitrobenzene and 13.6 kilos of commercial aniline are placed in a suitable glass reaction vessel equipped with reflux condenser, thermometer, means of heating, and agitator. To the reactants are added 200 liters of benzene as solvent and 38.5 kilos of finely pulverized commercial solid potassium hydroxide (87%). The temperature is gradually brought to 83° to 87° C., the refluxing temperature of the solvent, and the mass is then heated with good agitation for about 13 hours. The condensation products are then filtered and the resulting alkaline cake leached with more hot benzene.

The benzene filtrate is then extracted with 200 kilos of 15% hot aqueous hydrochloric acid to extract the phenazine oxide formed and present in the solvent while leaving the excess nitrobenzene and azobenzene in the benzene solvent. The acid filtrate is now boiled up with 10 kilos of concentrated acid and upon cooling is neutralized with ammonium hydroxide solution. The yellow phenazine oxide is precipitated, filtered off and dried. This may be readily converted into phenazine by heating to 200°–240° C. in the presence of finely divided iron filings.

In this example the nitrobenzene and aniline are used in molal proportions; and with such proportions and the use of benzene as a solvent I have obtained a yield of around 30 or somewhat more of phenazine oxide of 222°–223° C. melting point on the aniline used.

*Example 2.*—24.6 kilos of commercial nitrobenzene, 9.3 kilos of commercial aniline, and 32.0 kilos of finely ground solid potassium hydroxide are used instead of the amounts used in Example 1 and the process is carried out in a similar manner. In this case an excess of nitrobenzene is employed representing about 2 moles of nitrobenzene to 1 of aniline, and even with this excess of nitrobenzene the dilution of the reactants with the inert benzene solvent prevented any autocatalytic uncontrollable condensation. With these proportions of reagents I have obtained around 49% of phenazine oxide, based on the aniline used.

*Example 3.*—110 parts by weight of nitrobenzene, 23.35 parts by weight of aniline and 118 parts by weight of finely ground potassium hydroxide are used instead of the proportions of Example 1, and in a similar manner with about 180 parts by weight of benzene as solvent and with violent agitation at the refluxing temperature of the benzene for about 14 hours. The procedure is otherwise similar to that of Example 1. In this case the proportions of reagents were about 3.6 moles of nitrobenzene to 1 of aniline and with these proportions I have obtained yields of around 64% of phenazine oxide based on the aniline. The caustic potash used in this example corresponds to about .88% of the combined weight of the nitrobenzene and aniline.

*Example 4.*—98.3 parts by weight of nitrobenzene, 9.3 parts by weight of aniline, and 92.5 parts by weight of finely ground potassium hydroxide are caused to react in a manner similar to that described in Example 1, using about 135 parts by weight of benzene as solvent and with agitation for about 13 hours. These proportions represent about 8 moles of nitrobenzene to 1 of aniline and with these proportions I have obtained 67% of phenazine oxide based on the aniline. This phenazine oxide can readily be converted to phenazine of melting point 170° to 171° C. by known methods.

*Example 5.*—307.5 parts by weight of nitrobenzene, 23.25 parts of aniline, 290 parts of ground potassium hydroxide, and about 580 parts by weight of benzene are used and the process is carried out in a manner similar to that described in Example 1. These proportions represent about 10 moles of nitrobenzene to one of aniline and with these proportions I have obtained yields of phenazine oxide of melting point 224° to 225° C. equal to about 73% of the theory based on the aniline used.

*Example 6.*—Using the same proportions of reagents as in Example 4, but using about 87 parts by weight of toluene instead of 135 parts by weight of benzene as solvent gave a yield of phenazine oxide corresponding to about 68% of the theoretical, based on the aniline.

In the above examples the solvent from which the phenazine oxide is extracted, and containing dissolved therein the azobenzene and excess nitrobenzene, may be advantageously returned for reuse until the amount of azobenzene makes it desirable to treat the solvent for removal of the azobenzene before reuse. In this reuse of the solvent the process is cyclic in character and makes use of he excess nitrobenzene which is returned with the solvent, and also keeps the azobenzene in solution during reuse until the amount becomes objectionable. The presence of the azobenzene in the recycled solvent may also advantageously affect the process by retarding formation of further amounts of azobenzene.

So also, in the above examples the phenazine oxide, after extraction from the solvent with dilute acid, is separated by neutralization. Instead of neutralization, the phenazine oxide can advantageously be separated from the acid solution with regeneration of the acid for reuse in a cyclic manner by cooling the hot acid solution to precipitate phenazine oxide in the form of its monohydrochloride, separating it from the excess acid and decomposing the monohydrochloride by treatment with water.

In carrying out this cyclic process the alkaline condensation slurry obtained by condensation of nitrobenzene and aniline with caustic potash in the presence of an inert solvent is filtered while hot to remove the unwanted solid portion of the slurry and the hot solvent filtrate containing the phenazine oxide as well as excess nitrobenzene and azobenzene is subjected to an extraction operation with hot, aqueous mineral acid solution, as previously described. The aqueous mineral acid solution will remove substantially all of the phenazine oxide that is dissolved in the condensation solvent but leaving substantially all of the excess nitrobenzene and the azobenzene unextracted. The solvent is then ready to be recycled, thus reemploying the excess nitrobenzene dissolved in the solvent.

In the cyclic process, the hot aqueous hydrochloric acid solution containing the phenazine oxide is cooled, whereupon the largest part of the phenazine oxide contained therein is precipitated as phenazine oxide monohydrochloride. This may be filtered off, leaving a filtrate of cold, aqueous hydrochloric acid solution containing only a small part of the total yield of phenazine oxide. This acid solution may be cyclically reused, with addition of gaseous or aqueous hydrochloric acid as necessary for the extraction of further portions of phenazine oxide made in succeeding condensations.

I have found that the dissociation of phenazine oxide monohydrochloride is substantially complete in the presence of water when the added water gives a dilute hydrochloric acid solution containing less than about 2% hydrochloric acid. At higher hydrochloric acid concentrations, e. g., around 3% aqueous hydrochloric acid and higher, the solid phase is undissociated phenazine oxide monohydrochloride. This discovery is taken advantage of by adding cold water in regulated amount to the monohydrochloride, and I have found that when the precipitated phenazine oxide monohydrochloride is washed with suitable amounts of cold water it is decomposed and the free phenazine oxide formed, which is relatively insoluble in water. Since phenazine oxide, while relatively insoluble in water, increases in solubility in aqueous hydrochloric acid solution and as the temperature increases also shows some solubility increase, it is advantageous to wash the cold phenazine oxide monohydrochloride with a quantity of cold water sufficient to insure complete dissociation and minimum phenazine oxide solubility.

The present process enables a purified phenazine oxide to be obtained from cyclic condensation and extraction in high yields which is pure enough to be used directly for most industrial purposes. This cyclic process renders unnecessary the distillation of the solvent after each run to recover excess nitrobenzene contained therein; or the neutralization of the mineral acid solution to recover the free base phenazine oxide and the neutralization of the alkaline material remaining after condensation.

The cyclic method above described has the advantage of leaving the alkaline press cake, from which the solvent and dissolved reaction products have been separated, in a form such that it can be utilized. It may be worked up for the recovery of valuable by-products contained therein but it is advantageously first reused in a cyclic manner in the next condensation with the addition of finely ground sodium hydroxide to the alkaline cake. With low ratios of caustic potash to the reactants in the present process, the free unreacted potassium hydroxide present in the alkaline filter cake will be too low to cause appreciable new condensation when used with fresh reactants; but I have found that if sodium hydroxide is added to this potassium-containing filter cake from a previous run and which is rich in combined potassium salts the condensation will proceed as rapidly and as completely as though an equivalent charge of potassium hydroxide had been added. Thus the potassium present in the cake as potassium salts of phenols is rendered available for condensation if the potassium-containing cake is charged into the next condensation reaction with sodium hydroxide which in itself is incapable of causing a rapid and complete condensation to give high yields of product. The alkaline filter cake resulting from this further condensation is a sodium-containing cake and is not suitable for further recycling but it can be discarded from the process and worked up for the recovery of valuable products contained therein.

The following examples will further illustrate this cyclic process but it will be understood that the invention is not limited thereto. For example, the invention is not limited to the cyclic reuse of the solvents, although this is an advantageous feature of the invention; nor is the invention limited to the particular mineral acid employed in the examples. These examples also illustrate the cyclic reuse of the alkaline cake with added sodium hydroxide. Where the solvent is recycled, the azobenzene by-product will increase in concentration, depending upon the conditions of operation during the condensation; and, after repeated reuse the solvent may be by-passed from the cycle and distilled to leave a residue of azobenzene and excess nitrobenzene, which may advantageously be sent to the aniline plant for use, and a distillate of solvent which may be readded to the cycle with make-up material.

*Example 7—(First cycle).*—One-half mole of aniline (46.5 parts by weight) is added to 1 mole of nitrobenzene (123 parts) in a mechanical reactor equipped with steam jacket, thermometer, agitator and reflux condensation. To this are added 115 parts by weight of finely ground potassium hydroxide (87%) and about 450 parts by weight of benzene. The condensation is continued for about 9 hours under refluxing of the benzene at about 84 to 86° C. At the end of the condensation the reaction slurry is filtered while hot and the hot benzene filtrate, containing excess nitrobenzene, azobenzene, and the phenazine oxide, is extracted with about 950 parts by weight of 15% hydrochloric acid solution at about 78° C. The separated acid containing the extracted phenazine oxide is cooled to about 12° C. with precipitation of the monohydrochloride in the form of orange needle crystals from which the acid is filtered. The precipitated crystals of monohydrochloride are then washed in place with excess water to effect complete dissociation, leaving the free phenazine oxide base, which is then dried.

The cold hydrochloric acid solution separated from the precipitated monohydrochloride can be reused after heating and addition of gaseous or liquid hydrochloric acid to make up for losses, for the extraction of phenazine oxide from a successive operation. The alkaline benzene-insoluble cake separated on filtration of the slurry may also be reused, as illustrated in the following example.

*Example 8—(Second cycle).*—The dried potassium-containing filter cake from the first cycle (Example 7) is put back into the reactor with additional solvent together with 127 parts by weight of finely ground sodium hydroxide (100%) with a second charge of 46.5 parts by weight of aniline and 61.5 parts by weight of nitrobenzene, and with reuse of the solvent from the first cycle together with additional solvent to make up for losses, and the condensation is conducted at about 84–85° C. for about 12 hours at the end of which time it is worked up as described above, discharging the alkali cake, and reusing the hydrochloric acid solution remaining for the first cycle for extracting the phenazine oxide from the solvent, and with precipitation of the monohydrochloride on cooling and decomposition by washing with water, as in Example 7.

The dilute hydrochloric acid solution resulting from the dissociation of the monohydrochloride with water may contain small amounts of phenazine oxide. This can be recovered by neutralizing with ammonium hydroxide, preferably after first boiling up the hydrochloric acid solution with nitric acid. The alkaline press cake from the second cycle, before discarding or treating for recovery of products contained therein, is advantageously washed with fresh benzene to recover any phenazine oxide contained therein.

*Example 9.*—Instead of using benzene as a solvent, a mixture of benzene and toluene can be similarly used, e. g., of boiling point 84–85° C. After reuse one or more times the azobenzene content of the recycled solvent will increase and may be, for example, 100 parts by weight in 900 parts of solvent. To such a solvent, containing azobenzene, is added one-half mole of aniline (46.5 parts by weight) and nitrobenzene sufficient, with that contained in the solvent, to give one mole (123 parts by weight); and 125 parts by weight of finely ground potassium hydroxide are added. The condensation is conducted at the refluxing temperature of the solvent with agitation for about 11 hours. The reactor is then discharged and the hot slurry rapidly filtered while hot, the hot filtrate extracted with about 1300 parts by weight of hot 18–19% aqueous hydrochloric acid solution at 78° C. to remove the phenazine oxide contained in the solvent without removing any substantial amount of nitrobenzene and azobenzene present. The separated acid layer is cooled to about 20° C. to effect precipitation of the orange colored phenazine oxide monohydrochloride which is filtered and dissociated in place with excess cold water to give the free base phenazine oxide which is then dried.

The hot condensation solvent containing excess nitrobenzene and also containing azobenzene is advantageously returned while still hot for reuse and further addition made of aniline and of nitrobenzene, making allowance for the nitrobenzene already present in the recycled solvent. The solvent separated by filtration may thus have make-up solvent added to bring its total volume up to around 900 parts by weight with addition of 46.0 parts by weight of aniline, 61.5 of nitrobenzene and 130 of finely ground caustic potash and with further carrying out of the process with vigorous agitation and reflux of the solvent for about 14 hours and with treatment of the reaction slurry in the manner above described to separate the alkaline filter cake from the hot solvent filtrate which is then advantageously extracted with the recycled hot aqueous hydrochloric acid solution of the previous run, after reheating and addition of make-up acid; and the phenazine oxide can be recovered from the hydrochloric acid solution by cooling, filtration and decomposition with water as above described. The condensation solvent and the aqueous hydrochloric acid solution can be further recycled.

After carrying out a number of cycles, the azobenzene content of the recycled solvent may increase to a point where it is not feasible or desirable to recycle it further without removing the azobenzene. This may be accomplished by distilling the separated solvent to recover the benzene-toluene contained therein while leaving a residue of excess nitrobenzene and accumulated azobenzene which may be converted into aniline for further use in the process.

The cyclic process illustrated in Examples 7, 8 and 9 is shown graphically in Figure 1 of the accompanying drawings, which shows the addition of the nitrobenzene and aniline to the reactor together with the fresh or recycled and make-up solvent and with the caustic potash or recycled alkali cake with added caustic soda. In this flow sheet the alkaline filter cake from the hot filter is shown as being mixed with sodium hydroxide for recycling, thus illustrating this cycle of the process.

The flow sheet also shows the recycling of the solvent after extraction with hot hydrochloric acid to remove the phenazine oxide. When the content of azobenzene in the recycled solvent increases sufficiently it can be by-passed to a still, shown by broken lines, and the solvent redistilled for reuse, leaving an azobenzene residual liquor from which the azobenzene can be precipitated and removed by filtration and the remaining solvent returned to the cycle, thus giving azobenzene as a product of the process.

The flow sheet also shows a cycle of the process in which the hydrochloric acid is recovered and recycled, the hot hydrochloric acid being used to extract the phenazine oxide from the hot reaction solvent and the solution being then cooled to precipitate the phenazine oxide monohydrate from which the excess cold acid is separated and reheated with make-up acid added for further use in the cyclic process.

The flow sheet of Example 1 shows the various cyclic processes on the same flow sheet and these are advantageously combined in the operation of the process but it will be evident that these cycles are more or less independent in nature such that any one of them can be used without using the others; although they are advantageously used together.

The process of the preceding examples illustrates the use of aromatic inert solvents such as benzene and toluene in which phenazine oxide has a relatively high solubility, particularly when hot, so that the phenazine oxide is largely or almost entirely contained in the solvent filtered from the alkaline press cake at the end of the condensation.

The straight chain hydrocarbon solvents, such as hexane and ligroin, have only a limited solubility for phenazine oxide and are not so well adapted for use in the cyclic process of Examples 7 to 9; although where a large excess of nitrobenzene is present, which markedly increases the solubility of the mixture for phenazine oxide, the procedure of the previous examples can be followed, although there may be an increased amount of phenazine oxide remaining in the alkaline filter cake.

With straight chain hydrocarbon solvents another and somewhat different cyclic operation is advantageous. These solvents have a much greater selective solvent action for the azobenzene produced as a by-product than for the phenazine oxide product desired, and they have great solubility for both of the condensation reactants (nitrobenzene and aniline) and no solubility for the alkaline cake formed. Advantage is taken of the selective solubility action of these solvents in the new cyclic process. Following the condensation reaction in the presence of the straight chain saturated hydrocarbon the phenazine oxide formed is largely present admixed with the alkaline cake; and the reaction slurry is cooled, e. g., to room temperature or below to insure maximum precipitation of the phenazine oxide product and the slurry is then filtered cold to give a solid filter cake composed of a mixture of alkaline solvent insoluble cake and phenazine oxide product, while the filtrate will contain substantially all the azobenzene and any unreacted nitrobenzene. It may also contain a small amount of phenazine oxide. This filtrate may now advantageously be recycled to the condensation reactor to be used again in further condensation, without subjecting it to extraction to remove any phenazine oxide contained therein.

In the modified process the phenazine oxide is recovered from the filter cake. I have found that the filter cake can be washed in place, preferably with cold water, with dissolving of the alkaline potassium nitrophenol salts, leaving the crude phenazine oxide, which is substantially water insoluble, on the filter. The phenazine oxide thus obtained in high yields may be dried by any suitable means and used as such for most industrial uses, although it can be further purified if desired. It is advantageously used for the production of phenazine therefrom.

This modified cyclic process provides an inexpensive cyclic condensation and extraction operation which renders unnecessary the distillation of the hydrocarbon solvent after each run to recover the azobenzene contained therein and also renders unnecessary the use of any extraction operation to remove phenazine oxide selectively from the solvent and azobenzene contained therein and also makes unnecessary the utilization of the alkaline cake material by treatment with acid following the condensation in order to recover valuable products therefrom.

I have found that such saturated low boiling hydrocarbons, straight chain and branch chain, as hexane, heptane, octane, and mixed hydrocarbon solvents such as low and high boiling ligroin (Petroleum ether) and even low boiling kerosene, will, when used as described above, selectively dissolve the azobenzene by-product while leaving the phenazine oxide substantially undissolved. Higher boiling saturated hydrocarbons begin to lose this selective solvent power so that the lower boiling hydrocarbons are most advantageously used. This selective solvent action is appreciable with saturated hydrocarbons and mixtures thereof from hexane of boiling point 63°–70° C. to low boiling kerosene of boiling point 145°–220° C.

As these condensation solvents are recycled a number of times in the cyclic process they will become saturated with respect to azobenzene and may then be distilled to separate the solvent for reuse and for recovery of the azobenzene therefrom.

The following examples will further illustrate this use of the straight chain hydrocarbon solvents and this modified operation.

*Example 10*—(*First cycle*).—One-half mole of aniline (46.5 parts by weight) is added to one-half mole of nitrobenzene (61.5 parts by weight) in a mechanical reactor equipped with steam jacket, thermometer, agitator and reflux condenser. To this about 275 parts by weight of commercial hexane of boiling point 63–70° C. is added with 58 parts by weight of finely ground caustic potash. The condensation is run for about 14 at the refluxing temperature of the mixture. The slurry is then cooled to about 30° C. and filtered. The filter cake is sucked dry and washed in place with water and the alkaline water soluble portion is dissolved out, leaving a cake of crude brown-colored phenazine oxide, which is air dried. The hexane filtrate contains the azobenzene formed and also a small amount of phenazine oxide. This solvent can be recycled and reused without extracting the phenazine oxide but where it is desired to recover the phenazine oxide from it this can be done by extracting with aqueous 15% hydrochloric acid solution which dissolves the phenazine oxide present in the hexane solution while leaving any azobenzene substantially unextracted. The aqueous acid solution is then neutralized with ammonium hydroxide to separate the phenazine oxide which is filtered and dried.

*Example 11*—(*Second cycle*).—The hexane solvent from the first cycle (Example 10), about 270 parts by weight, is charged into the mechanical reactor with 46.5 parts by weight of aniline and 61.5 of nitrobenzene, and 58 parts by weight of finely ground potassium hydroxide is added and the condensation conducted at the refluxing temperature of the solvent for about 14 hours. The slurry is then cooled to about 1° C. and filtered. The filter cake is sucked dry and washed in place with water, leaving a crude brown phenazine oxide product. When the hexane solvent, after reuse, contains too large an amount of azobenzene for recycling, it can be distilled to recover the hexane for recycling and to give the azobenzene as a by-product. In this case the solvent is advantageously extracted with acid to obtain any dissolved phenazine oxide therefrom, before distillation. When the solvent is recycled, the small amount of phenazine oxide present in it after filtration can advantageously be left in it during a continuous cyclic operation run, and the solvent subjected to acid extraction only after repeated reuse and before it is distilled to separate it from accumulated azobenzene by-product.

*Example 12.*—Ligroin of boiling point 90°–120° C. is used as the selective condensation solvent instead of hexane but with a procedure similar to that of Examples 10 and 11, using, e. g., 18.6 parts of aniline, 49.2 parts of nitrobenzene, 46.3 parts of powdered caustic potash (87%) and about 75 parts of ligroin (these parts being by weight), with carrying out of the condensation at the reflux temperature of the solvent and with agitation for about 13 hours and with subsequent cooling of the reaction slurry to about 1° C., filtration to remove the ligroin solution, and washing of the condensation filter cake with water to dissolve the water soluble alkaline material, leaving a crude phenazine oxide product which is dried.

In the second cycle of operations the ligroin hydrocarbon solvent from the first condensation cycle, containing the by-product azobenzene and some free nitrobenzene, is recharged into the reactor with 18.6 parts of aniline, 24.6 parts of nitrobenzene and 23 parts of finely ground potassium hydroxide, these parts being by weight and the condensation continued at the refluxing temperature for about 13 hours. Following the condensation the slurry is cooled to 4° C. and rapidly filtered, the filter cake sucked dry and the alkaline salt of nitrophenol leached out with water washing, leaving a brownish yellow phenazine oxide product which is then dried. The ligroin hydrocarbon solution is then available for reuse in the next cycle. After repeated reuse the concentration of benzene will approach its limiting solubility and the solvent can then be subjected to distillation to recover the solvent, leaving the azobenzene and some nitrozenbene which may be converted to aniline.

The modified process of Examples 10, 11 and 12 is illustrated by the flow sheet of Figure 2. The reactor in this case may be used both for heating with steam to carry out the condensation and subsequently by cooling with water for increasing the precipitation of the phenazine oxide before filtering the cold slurry. The solvent recovered from the filter is shown as being returned with its contained solubles and without treatment to extract the small amount of phenazine oxide contained therein.

As previously pointed out, the present process enables phenazine oxide to be prepared directly; without further purification, of a sufficient purity to be used commercially for most purposes. It is advantageously used for the production of phenazine therefrom which is a valuable organic insecticide.

I claim:

1. The method of producing phenazine oxide which comprises subjecting nitrobenzene and aniline to condensation with an alkaline condensing agent in the presence of an inert diluting solvent and with a ratio of nitrobenzene to aniline at least equal to the molecular ratio.

2. The method of producing phenazine oxide which comprises subjecting nitrobenzene and aniline to condensation with an alkaline condensing agent in the presence of an inert diluting solvent and with the use of a large excess of nitrobenzene over that corresponding to the molecular ratio with the aniline.

3. The method of producing phenazine oxide which comprises subjecting nitrobenzene and aniline with a ratio of nitrobenzene to aniline at least equal to the molecular ratio to condensation in the presence of an inert diluting aromatic hydrocarbon solvent in which the phenazine oxide produced is readily soluble, separating the resulting solution, at the end of the condensation, from the reaction slurry, separating the phenazine oxide from the resulting solution, and returning the solvent for further use in the process.

4. The method of producing phenazine oxide which comprises subjecting nitrobenzene and aniline with a ratio of nitrobenzene to aniline at least equal to the molecular ratio to condensation with an alkaline condensing agent and in the presence of an inert diluting solvent in which the phenazine oxide formed is readily soluble, separating the resulting solution from the insoluble residue at the end of the condensation, selectively extracting the phenazine oxide from the solution by treatment with dilute acid and returning the solvent with dissolved reagents and reaction products for further use in the process.

5. The method of producing phenazine oxide which comprises subjecting a large molecular excess of nitrobenzene to condensation with aniline and an alkaline condensing agent and in the presence of an inert diluting solvent, separating the phenazine oxide and insoluble alkali-containing constituents from the solvent at the end of the condensation and returning the solvent with excess nitrobenzene and soluble by-products therein for further use in the process.

6. The process of producing phenazine oxide which comprises subjecting nitrobenzene and aniline with a ratio of nitrobenzene to aniline at least equal to the molecular ratio to condensation with an alkaline condensing agent and in the presence of an insert diluting hydrocarbon solvent in which the phenazine oxide has only a limited solubility, separating the insoluble phenazine oxide and other insoluble constituents at the end of the condensation, and returning the solvent and dissolved constituents for further use in the process.

7. The method of producing phenazine oxide which comprises subjecting nitrobenzene and aniline with a ratio of nitrobenzene to aniline at least equal to the molecular ratio to condensation with an alkaline condensing agent in the presence of an inert diluting solvent in which the phenazine oxide formed is readily soluble, subjecting the resulting alkaline slurry to filtration to separate the solvent and dissolved constituents from the insoluble residue, selectively extracting phenazine oxide from the resulting solution while hot with dilute hydrochloric acid, cooling the acid solution to separate phenazine oxide monohydrochloride therefrom, returning the excess acid for further use in the process, and treating the monohydrochloride with water to produce phenazine oxide therefrom.

8. The method of producing phenazine oxide which comprises subjecting a large molecular excess of nitrobenzene to condensation with aniline in the presence of an alkaline condensing agent and an inert aromatic hydrocarbon solvent at the refluxing temperature of the solvent, filtering the resulting hot slurry to separate insoluble residue from the resulting solution, extracting phenazine oxide from the resulting hot solution with dilute hydrochloric acid to obtain a hot hydrochloric acid solution of phenazine oxide, cooling the solution to deposit phenazine oxide monohydrochloride therefrom, separating the monohydrochloride from the excess acid, returning the acid after reheating and addition of make-up acid for further extraction of phenazine oxide from the hot solution in the further carrying out of the process, and treating the monohydrochloride with water to produce phenazine oxide therefrom.

9. The method of producing phenazine oxide which comprises subjecting nitrobenzene and aniline with a ratio of nitrobenzene to aniline at least equal to the molecular ratio to condensation with an alkaline condensing agent in the presence of an inert straight chain hydrocarbon solvent in which phenazine oxide is relatively insoluble and at the boiling point of the solvent, cooling the reaction mixture, filtering the resulting slurry to separate insoluble phenazine oxide and other insoluble constituents from the resulting solvent and dissolved constituents and subjecting the insoluble material to treatment with water to dissolve soluble alkaline constituents and leave the insoluble phenazine oxide.

10. The method of producing phenazine oxide which comprises subjecting a large molecular excess of nitrobenzene to condensation with aniline with an alkaline condensing agent and in the presence of an inert diluting solvent, separating the phenazine oxide and the insoluble alkaline constituents from the reaction products, returning the separated solvent with dissolved constituents, including excess nitrobenzene and azobenzene produced by the condensation, for further use in the process, and continuing to recycle and reuse the solvent in a cyclic manner until the solvent approaches saturation with azobenzene, and then treating the resulting solution to separate azobenzene therefrom and to recover the solvent for further use in the process.

11. The process according to claim 10 in which the solvent is an aromatic hydrocarbon solvent in which phenazine oxide is readily soluble and in which the phenazine oxide is selectively extracted from solution in the hot solvent by extraction while hot with dilute hydrochloric acid.

12. The process according to claim 10 in which the solvent is a straight chain aliphatic hydrocarbon solvent in which the phenazine oxide is relatively insoluble and in which the insoluble mixture of phenazine oxide and alkaline materials, separated from the solution at the end of the condensation, is treated with water to dissolve the alkaline constituents, leaving the insoluble phenazine oxide as a product.

13. The method of producing phenazine oxide which comprises subjecting nitrobenzene in large excess to condensation with aniline with an alkaline condensing agent and in the presence of a straight chain aliphatic hydrocarbon in which phenazine oxide has only a limited solubility, and at the boiling point and with refluxing of the solvent, cooling the reaction mixture, filtering it while cold to separate the solvent and dissolved constituents from the insoluble phenazine oxide and insoluble alkaline constituents, returning the solvent and dissolved constituents for further use in the process, and treating the insoluble material with water to dissolve alkaline constituents and leave undissolved phenazine oxide.

14. The method of producing phenazine oxide which comprises subjecting nitrobenzene in large molecular excess to condensation with aniline and an alkaline condensing agent and in the presence of an inert diluting aromatic hydrocarbon solvent at the boiling point and with refluxing of the solvent, filtering the resulting hot slurry to separate the solvent and dissolved constituents from the insoluble residue, treating the resulting hot solution with dilute hydrochloric acid to effect selective extraction of phenazine oxide therefrom, returning the solvent and remaining dissolved constituents including excess nitrobenzene for further use in the process, cooling the hot hydrochloric acid solution to crystallize phenazine oxide monohydrochloride therefrom, reheating the excess acid and returning it with make-up acid for further use in extracting phenazine oxide from the hot solvent solution in the further carrying out of the process, and treating the monohydrochloride with water to form phenazine oxide therefrom.

15. The method of producing phenazine oxide which comprises subjecting nitrobenzene and aniline to condensation with finely divided caustic potash as condensing agent and in the presence of an inert diluting solvent in which the phenazine oxide formed is readily soluble, separating the resulting solution from the insoluble alkaline material at the end of the condensation, returning the resulting alkaline residue with added caustic soda and carrying out a further condensation with the resulting mixture as condensing agent and with resulting formation of an alkaline sodium-containing residue.

EDWARD CORNELIUS SOULE.